United States Patent

[11] 3,604,898

| [72] | Inventor | Sven Tore Magnus Magnusson<br>Goteborg, Sweden |
|---|---|---|
| [21] | Appl. No. | 713,488 |
| [22] | Filed | Mar. 15, 1968 |
| [45] | Patented | Sept. 14, 1971 |
| [73] | Assignee | Telub AB<br>Vaxjo, Sweden |
| [32] | Priority | Mar. 17, 1967 |
| [33] | | Sweden |
| [31] | | 3730/67 |

[54] A FULLY AUTOMATIC OR SEMIAUTOMATIC PARKING AREA
3 Claims, 6 Drawing Figs.

[52] U.S. Cl. .................................................. 235/61.6,
194/4 R, 194/9 R
[51] Int. Cl. ...................................................... G06k 17/00
[50] Field of Search ............................................ 194/4, DIG.
23, 2, 9, 10; 235/61.6

[56] References Cited
UNITED STATES PATENTS

| 2,783,865 | 3/1957 | Cleave | 194/4 |
|---|---|---|---|
| 2,795,875 | 6/1957 | Nutter et al. | 194/DIG. 23 |
| 2,906,505 | 9/1959 | Orr et al. | 194/4 X |
| 3,212,615 | 10/1965 | Hellar, Jr. | 194/4 |
| 3,273,683 | 9/1966 | Goodman | 194/4 |
| 3,282,388 | 11/1966 | Lester et al. | 194/4 |
| 3,484,586 | 12/1969 | Wilson et al. | 194/9 X |

Primary Examiner—Samuel F. Coleman
Attorney—Wenderoth, Lind & Ponack

ABSTRACT: The present invention relates to a fully automatic or a semiautomatic parking plant in which means are arranged for ensuring that the parking fee is calculated in a correct way and this even when different rates are valid for different hours of the day. The parking plant according to this invention is of the kind in which a ticket is received at the entry bearing markings for indicating the entry time and in which a ticket-checking apparatus or cash register is arranged at the exit for sensing the markings on the ticket and calculating the fee. The plant is further provided with a period number work which is driven by means of a programming work driven by a clock work, the period number work adapted to deliver its values to the ticket distributor at the entry of the plant or to the cash register.

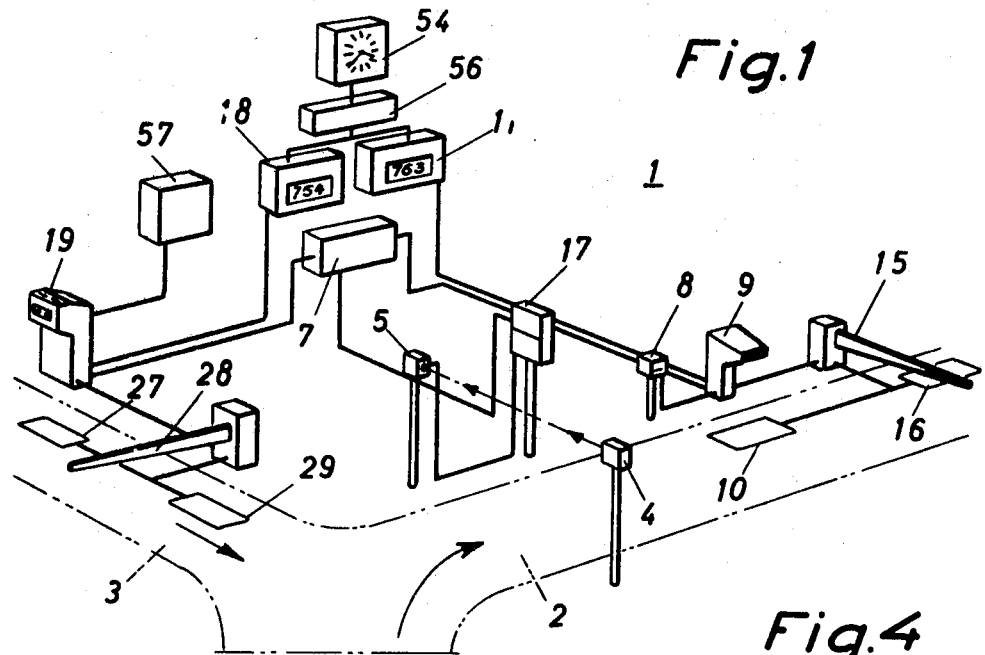
Fig.1
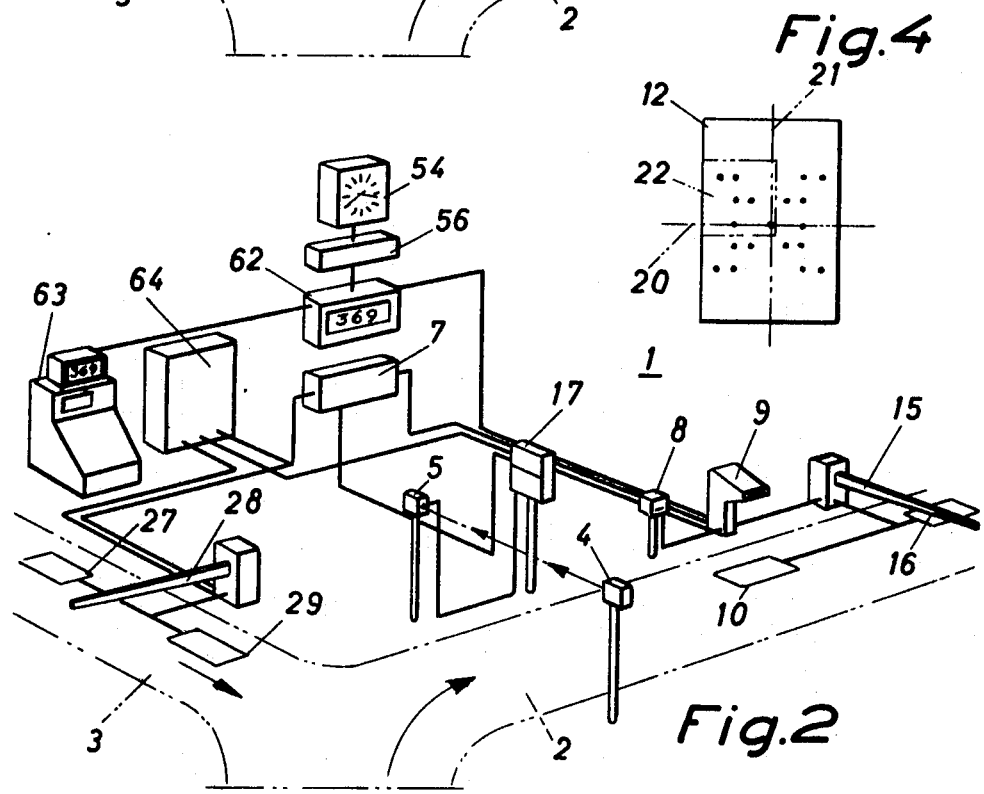
Fig.4
Fig.2
SVEN TORE MAGNUS MAGNUSSON,
INVENTOR

EXAMPLE OF PROGRESSIVE FEE SETTING

A FULLY AUTOMATIC OR SEMIAUTOMATIC PARKING AREA

Fully automatic or semiautomatic parking areas using counters for the parking of vehicles in which the persons parking have to pay for the time they have parked their vehicles, are known.

According to such a known area there is provided on the one hand at the entry a counter dispenser adapted to distribute to every parking person an entry counter the size of which corresponds to the moment of entry and on the other hand a payment receiver comprising a counter sensor for the entry counters and a counter dispenser adapted, at the receipt of a payment corresponding to the time difference between the moment of entry indicated by the entry counter and the time of departure to distribute an exit counter the size of which corresponds to the time point for affecting the payment receiver and further a counter receiver at the exit adapted to release a latch at the exit when the receiving an exit counter of a size corresponding to the moment of exit.

Such a parking plant has certain drawbacks. Mistakes may occur in the sensing of the counters. Also in large plants there is a question of an important number of counters and these counters have to be returned from the exit to the entry and there be sorted according to size and this work causes troubles and a considerable waste of time. This system makes it difficult to determine the length of the parking time with any accurateness.

There are also known parking areas in which a ticket on which the time is printed is obtained at the entry and has to be presented at the exit and the payment is paid to a special person. Thus, in this case there is a question of manual operation of the area which is cost consuming.

The object of the present invention is to overcome said drawbacks. The invention relates more particularly to fully-automatic or semiautomatic parking areas for vehicles of the kind comprising a ticket distributor at the entry adapted at the delivery of a ticket to render possible the passing of a vehicle into the parking area and at the exit-ticket-checking apparatus or a cash-register for calculating the fee for the time the vehicle has been parked and at least a parking period number mechanism. The main feature of the invention is to be seen therein that the parking period number corresponding to the time period mechanism is adapted to be driven by means of a programming device which in its turn is driven by means of a clock mechanism and adapted to deliver its values to the ticket distributor or the cash register. By means of the programming device it is possible to adjust different period lengths and the parking fee may be calculated according to different rates.

In semiautomatic parking areas there is required one single period number device. In fully automatic areas there are required two period number devices. These devices are adapted to be driven with the same speed by the programming device and adapted to deliver continuously their values on the one hand to the ticket distributor (distributors) and on the other hand to the ticket-checking apparatus (apparatuses).

So as to simplify the fee calculation the parking time is divided into parking periods and the fee for each started period may be e.g. 1 crown. Thus, the fee per hour is depending on the length of each time parking period. With the time parking period length of 2 hours, the parking fee is 0.05 crowns per hour and if the time period length is 20 minutes, the fee will be 3 crowns per hour and so on. Thus, if the time period is 1 hour, the fee will be 1 crown per hour. By means of the programming apparatus according to the invention, the period length may be chosen according to the rate in force for the different hours of the day. However, if a customer enters with his vehicle and parks the same about 5 minutes before a parking period change and leaves the plant after 10 minutes, he should according to the above calculation have to pay for two parking periods i.e. 2 crowns. This is unjust and in order to reduce such errors each period is in turn divided into 10 part periods.

Thus each part period costs 0.10 crowns but in a fully automatic system undivided numbers of crowns are, from the point of view of payment, preferably so that the customer instead has to pay for 10 part periods at the time. In a fully automatic parking plant having only one period number work, the same period number is delivered at the entrance and at the departure. In this case the ticket-checking apparatus is provided with a device which rounds off the calculated sum to the next undivided number of crowns, e.g. 1.8 periods = 2 crowns.

With two parking period number devices the apparatus for rounding off the sum is not needed in the ticket-checking apparatus and one obtains essentially the same result if the number device for departure is nine part periods lower than the corresponding one at the entrance. In the start position the numeral value of the first period number device is 999 and the last number device is 990. The corresponding numerals could also be 9999 and 9990 and when the number devices have reached the number 0 they are automatically readjusted to said elevated start values.

In parking areas of large capacity it may be a drawback to locate the payment point at the exit proper for the reason that long queues build up because of the payment requiring too long a time. In such a case the ticket-checking apparatuses could be located in such a way that payment can be performed before the customer enters his vehicle. At such payment the customer obtains a new ticket provided with another period number. This ticket is then used at a ticket-checking apparatus at the exit bar for opening the same. This has, however, to be carried out within a certain time period after the payment of the fee and in order to check this one or two further period number devices are required. In such a case the periods must always have the same length, e.g. 1, 2, or 5 minutes. The calculating system with period numbers will be described more in detail with reference to the accompanying diagrammatical drawings in which:

FIG. 1 shows a block diagram for a fully automatically automatic parking area provided with two period number devices, FIG. 2 shows a similar block diagram for a semiautomatic area, FIG. 4 shows a ticket obtained from the ticket-distributing apparatus with the value from its period number device stamped in binary form.

Figure 6:
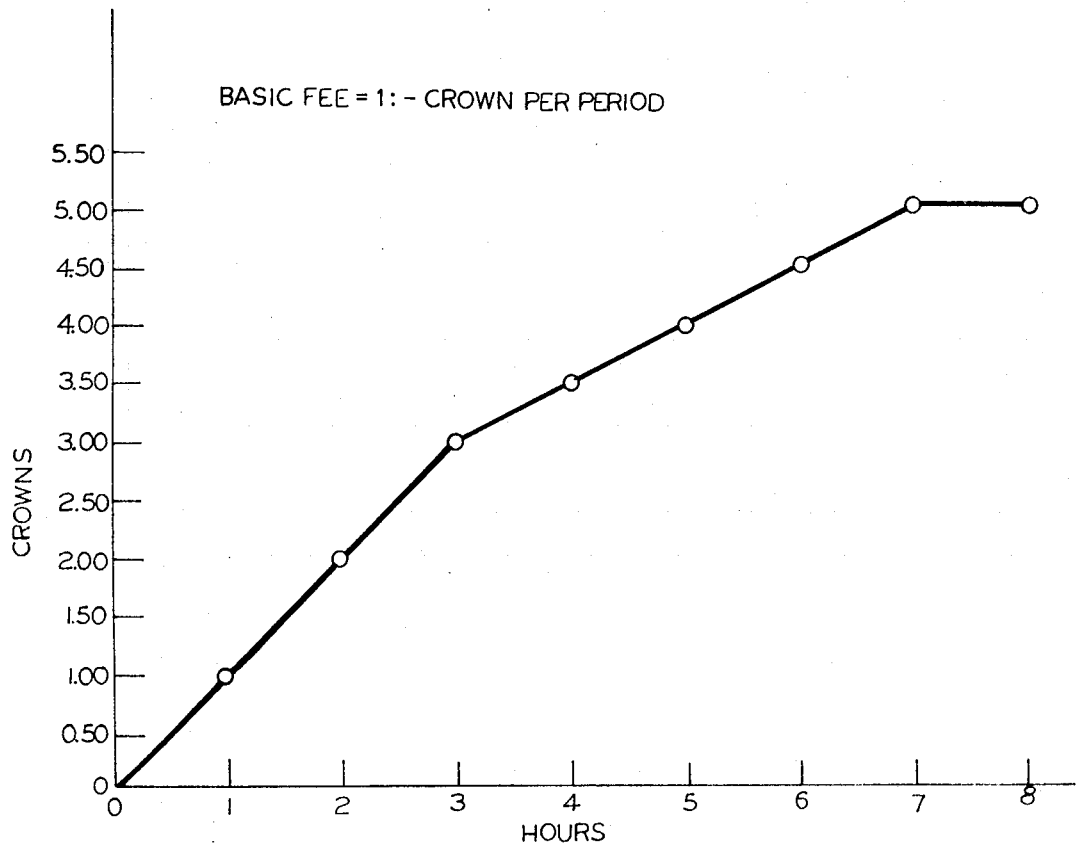

FIG. 6 is a graph illustrating the progressive costs. The parking area area 1 in the area shown in FIG. 1 is entered on an entry ramp 2 and the area is vacated on a departure ramp 3. At the entry ramp 2 there is arranged a device 4, 5 which electrically senses the height of a vehicle 6 to be parked in the area 1. In case of too high a vehicle a red stoplight is illuminated. To the left of the ramp 2 there is further located a device 8 for reading customer cards and a ticket delivery device 9. A contact 10 is arranged in the road path to produce in a mechanical, inductive or capacitive way an impulse to the ticket distributor 9 for delivering a ticket. This ticket at the same time is provided with the number corresponding to the time period which is indicated in the period number device 11 coupled to the ticket distributor as a color code or a punched code. The ticket 12 (FIG. 3) is cut off from a ticket strip 13 and is fed over a contact device 14 which is closed only when the customer takes the ticket from the distributor 9. At the closing of this contact device a drive is actuated for opening a bar 15 closing the entry 2. A customer with a subscription card puts this card only for a moment into the customer card sensor 8. The ticket distributor 9 is then shunted and the entry bar 15 is opened when the vehicle 6 passes the contact device 10. The bar 15 is reclosed when the vehicle 6 passes a contact device 16 on the other side of the bar. At the same time as the bar 15 is fed with an opening impulse from the ticket distributor 9 or the card sensor 8, an impulse is given to the computer in a register 7 which is fed one step for each impulse. This computer also receives one impulse each time a vehicle leaves the parking area 1 but is then fed a step rearwards for each impulse. The computer thus shows the number of vehicles parked in the area. When all the places are occupied, a stoplight 17 is illuminated.

The second number corresponding to the time period in the device 18 in the plant is coupled to the ticket-checking apparatus 19. The customer who desires to leave the parking area 1 with his vehicle 6 drives the vehicle 6 out on the departure ramp 3 puts his ticket into this apparatus 19. The number code on the ticket 12 is positioned in such a way that it is of no importance which end of the ticket is entered, nor does it matter if the wrong or right side is turned upwards.

An example of a ticket 12 with the code number 369 is shown in FIG. 4. The central axes of the ticket have been denoted with reference numerals 20 and 21. The surface of the ticket 12 sensed in the checking apparatus 19 has been denoted by reference numeral 22. Within this surface the first number is indicated by 1+2=3, the second number by 2+4=6 and the third number by 2+7=9. It is obvious from FIG. 4 that the same code value is obtained also when the ticket 12 is turned end for end or inserted into the apparatus with the back side turned upwards. In all cases six code points will be sensed which points are situated at the same mutual distance within the sensed surface 22.

In the checking apparatus 19 a calculation of the fee is made wherein the period number in the device 18 is subtracted from the code number on the ticket 12 inserted into he apparatus. If only one period number is arranged for the fee calculation (as in FIG. 2), there is carried out, by means of a device in the checking apparatus, a rounding off of the calculated sum to the next crown number. When the plant is provided with two period number devices, the period number at the entry is nine units higher than the period number at the departure. In this case the checking apparatus 19 is simplified in that no device is required for rounding off the sum.

EXAMPLES

In an area having a one period number device:

It is assumed that a customer receives at the entrance the period number 369 indicated on the ticket 12. It is further assumed that the period number 351 is the actual number at the departure. The difference will then be 369−351 =18 part periods, i.e.. 1.8 periods. As he has to pay 1 crown for each started period, the parking fee will be 2 crowns. In the checking apparatus 19 a rounding off the value 1.8 to 2 takes place.

In an area having tow period number devices:

It is assumed that a customer receives at the entry a ticket 12 with the period number 369 indicated thereon. It is further assumed that at the departure the number 342 is valid for the period device. 18. The difference will then be 369−342=27 part periods or 2.7 full periods. It is to be noted that this is not the real parking time which is 369− (342+9) =1.8 periods. (The period number device at the exit always shows a value which is nine units lower than the period number device at the entrance). The fee to be paid by the customer is obtained quite simply thereby that the part periods are not included in the final result which in this example was 2.7. Thus, the fee will be 2 crowns for the real parking time of 1.8 periods.

The result shown in crowns in a number table 23. The customer pays by putting coins into a coin-receiving slot 24 in the checking apparatus and when the fee is paid a contact means 25 in the apparatus is closed. When a subscription card is used, this card is inserted into a card slot 26 in the apparatus 19 to be read or sensed. If the card is correct, such a sensing will also result in closing of the contact means 25. When the vehicle 6 passes a contact means 27 situated in front of the apparatus 19 on the departure ramp 33, an impulse is given to the driving means for a bar 28 extending transversely over the departure ramp 3 and thereby this bar is lifted. When the vehicle 6 passes over a contact device 29 situated beyond the departure frame 3, an impulse is again given to the driving means for the bar which then is lowered. Simultaneously with the closing of the contact means 25 or 29 an impulse is also given to the counting device in the register device 7 which then is fed a step rearwards and indicates that the number of vehicles within the area 1 has been reduced by one.

Figure 3:
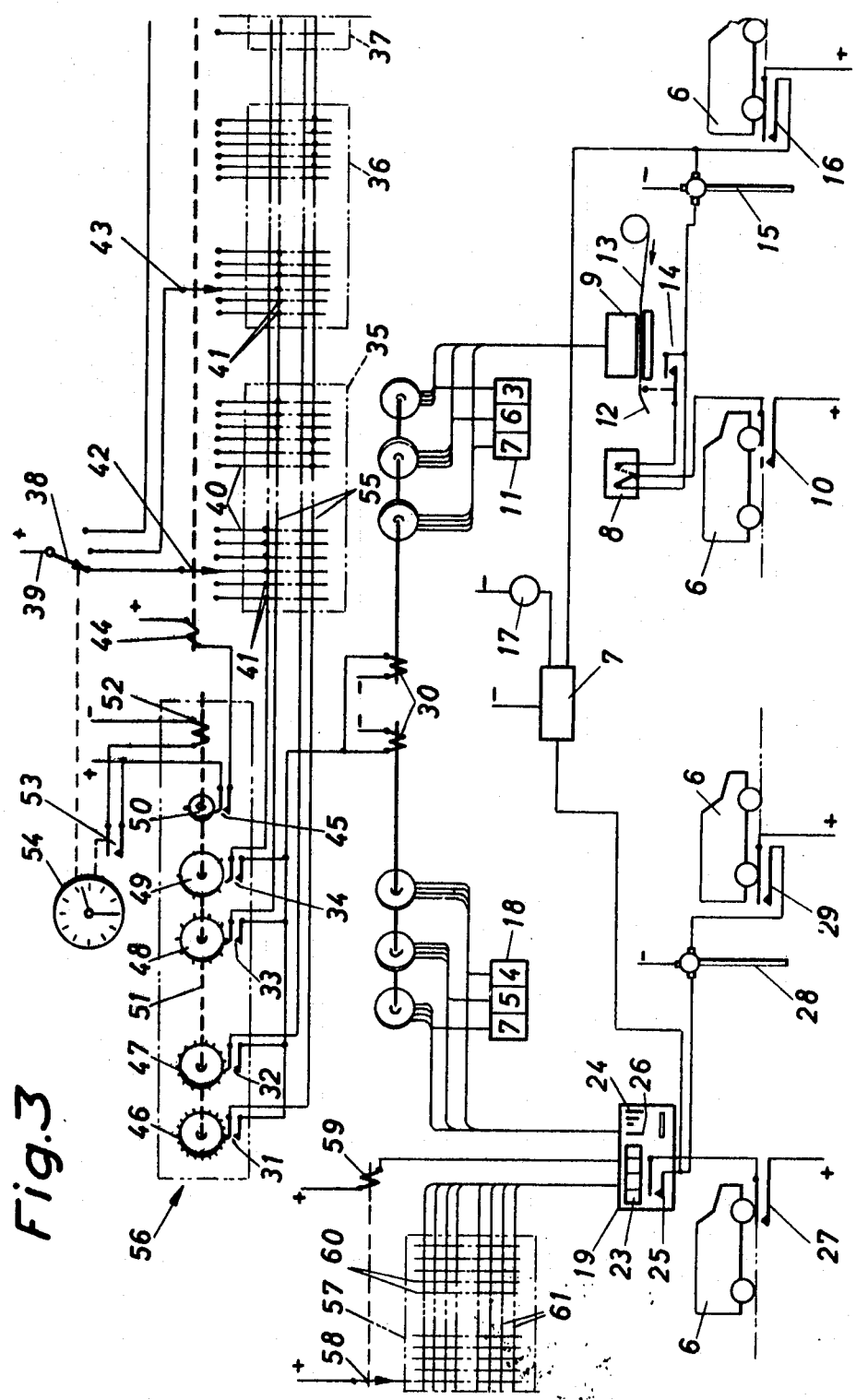
FIG. 3 shows a diagram for the fully automatic area of FIG. 1.

The two counting devices of the period number devices 11 and 18 are driven continuously and simultaneously by one and the same driving means 30. The latter is via contact means 31, 32, 33, and 34 and via a number of coupling tables 35, 36, and 37 and a switch 38 connected to a current supply 39. Each table 35, 36, 37 is provided with a number of vertical coupling rails 40 corresponding to the hours of the day and may by means of plugs 41 be, in a desired way, coupled to any of the contact means 31, 32, 33, or 34. Each coupling table 35, 36, 37 has a step selector 42, 43 which is moved one step to the side each hour by means of a driving device 44. The driving device 44 receives impulses from a contact means 45. The time between "impluses" is equal to a part period, and 10 part periods equal one period length. The different contact means 31, 32, 33, 34 and 45 are closed by each their cam disk 46, 47, 48, 49, and 50, respectively, which are arranged on a common shaft 51 that is turned step by step by means of a driving device 52 1 revolution per hour. The driving device 52 is via a contact device 53 connected to a clock mechanism 54 which preferably is driven electrically. The left-hand cam disk 46 shown in FIG. 3 is assumed to give 20 impulses per hour, the cam disk 47 15 impulses per hour, the cam disk 48 10 impulses per hour and the cam disk 49 five impulses per hour. Period lengths of 30 minutes, 40 minutes, 1 hour, 2 hours are thus obtained which corresponds to the rates 2.00, 1.50, 1.00, and 0.50 crowns per hour. The cam disk 50 gives an impulse to the driving device 44 for the step selectors 42, 43 each hour. In response to the position of the switch 38, the step selectors feed electric current to the vertical coupling rail 40 in the coupling table 35, 36, 37 corresponding to the actual hour. In FIG. 3 there is shown only three coupling tables 35, 36, 37 of which the table 35 is intended for Monday to Friday the table 36 for Saturday and the table 37 for Sunday. However, one coupling table may be arranged for each day of the week. The correct table is coupled in by means of the switch 38 which is connected to the clock mechanism 54 or an impulse arrangement in the same. The horizontal coupling rails 55 in the tables 35, 36, 37 are coupled to the contact devices 31–34 of the cam disks 46–49 and by means of the plugs 41 in the tables 35, 36, 37 it is possible to choose different period lengths and thus different rates for different hours of the day.

In the diagram shown in FIG. 3 the following rates have been coupled as examples. PSS

| hour | Monday-Friday | Saturday | Sunday |
| --- | --- | --- | --- |
| 00 –06 | 0.50 Cr./h | 1.00 Cr./h | |
| 18 – 21 | 2.00 Cr./h | 2.00 Cr./h | |
| 21 – 24 | 1.00 Cr./h | 2.00 Cr./h | |

Of course the number of coupling tables 35, 36, 37 may be varied and so may the rates. The rates may be chosen in such a way e.g. that they be situated between 6 Cr./hr. (one period = 6 min.) and 0.10 Cr./hr. (one period = 10 hours).

The impulses which are obtained by the actually coupled cam disk 46–49 in the programming device 56 are fed to the period number devices 11 and 18 and reduces the values in the same by one unit. The number devices give either the decimal or binary form electrically the actual period number on the one hand to the ticket distributor 9 at the entrance 2 and on the other hand to the ticket-checking device 19 at the departure 3.

Figure 5:
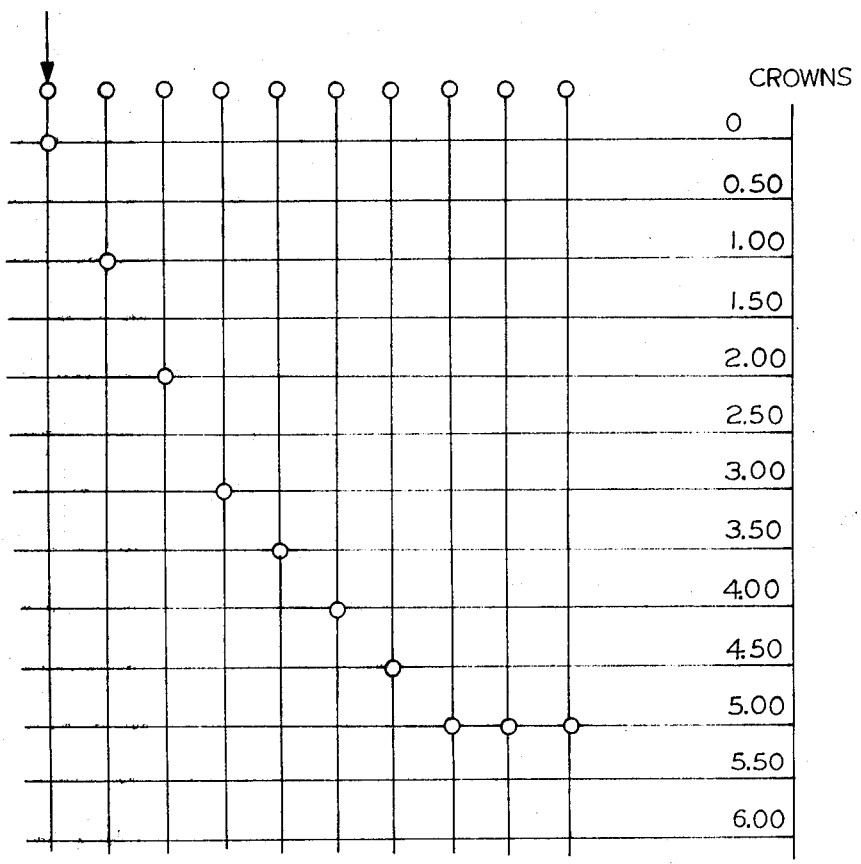
FIG. 5 is a diagram illustrating how the coupling table is plugged.

When there is required a rate that varies with the length of the parking the ticket-checking device 19 may be provided with a further coupling table 57 with a step selector 58 which by means of a means 59 is driven by the checking apparatus 19. The step selector 58 is fed in forward direction along the vertical coupling rails 60 of the table a number of steps that corresponds to the number of periods of the parking. The horizontal coupling rails 61 correspond to the different factors by which the period number is to be multiplied. The result is, in normal order, indicated on the number table 23. The ticket-checking device 19 may be provided with a device giving a receipt of the fee paid. FIG. 5 shows how the coupling table 57 is plugged so that for each one of the first 3 hours there is charged 1 crown and for the next 4 hours there is charged 0.5 crowns for each hour, etc. The progressive costs are shown in FIG. 6 by means of a graph. The example shows the case when the charges are reduced at long-time parkings. The opposite case is possible in areas where short-time parkings are desired.

When the parking area is of such a size that there exists a risk for an accumulation of customers at the departure due to the time required for the customer to pay, the ticket-checking apparatuses are placed in such a way that the customer can pay before he collects his vehicle. In such a case there is placed at the side of the ticket-checking apparatuses, a ticket distributor delivering a departure ticket when the customer has paid. The ticket distributor is fed from a separate period number device. At the departure bar there is arranged a departure-checking apparatus into which the departure ticket is fed. In the checking apparatus there is carried out a checking that the time at the customer's disposal from the payment point till his departure has not been exceeded. Arranged at the departure bar is a customer-card sensor which otherwise would be placed in the ticket-checking apparatus 19.

The area may also be provided with a loud speaker and television equipment for surveying customers. At calls to a central surveying post or in case of an alarm on account of something abnormal happening in the area, the actual television camera is automatically coupled in.

The area may also, as shown in FIG. 2, be driven semiautomatically and in such a case only one period number device 62 has to be used. The ticket-checking apparatus 19 according to FIGS. 1 and 3 is replaced by a cash register 63. In the ticket distributor 9 the period number is stamped—preferably in numeral characters and the same period number is used at the entry ramp as at the departure ramp 3. At departure, the customer delivers his ticket to the cash desk. The cashier puts the ticket into the register of the cash register, keys the period number of the ticket and also the actual period number at the departure and carries out the subtraction. The different transactions are then printed on the ticket at the same time.

The cash register 63 may also be provided with a device which locks the register if the period number at the departure has been keyed in a wrong way. This gives a possibility of checking that the correct parking fee indicated on the ticket by the cash register is correct.

Also a combination of fully automatic and semiautomatic operations is possible.

Reference numeral 64 denotes an operation table.

The invention has been described in the aforegoing for purposes of illustration only and is not intended to be restricted by this description or otherwise, and thus the different parts of the parking plant may be constructively modified in many ways without departure from the invention idea. This is true in particular for the contact means and the devices which are required for the lowering and lifting of the bars 15 and 28. The number of cam disks 46–49 and the devices for their operation is independent of the invention.

I claim:

1. A parking area for vehicles having an entry 2 and an exit 3 comprising a ticket distributor 9 at said entry 2 for dispensing a ticket 12 for allowing the passage of a vehicle 6 into said parking area 1, a ticket checking apparatus 19 at said exit 3 for calculating the fee for the parking time of a vehicle in said parking area 1, a clock mechanism 54, a programming device 56, two period number devices 11, 18 driven with the same speed by said programming device 56, means for delivering continuously the values of said period number devices to said ticket distributor 9 and to said ticket checking device 19, said programming device 56 comprising a plurality of cam disks 46, 47, 48, 49 with contact means 31, 32, 33, 34 arranged on a shaft 51 driven by means of an impulse generator 53 driven by said clock mechanism 54, a plurality of coupling tables 35, 36, 37 corresponding to the days of the week and adapted to be coupled in by means of a setup selector 43, 42 via a switch 38 driven by said clock mechanism 54, said tables 35, 36, 37 having coupling rails 40, 55 for the choice of different calculation rates which are selectively connectable to said driving means of said period number devices 11, 18 via any of said contact means 31, 32, 33, 34 of said cam disks.

2. A parking area as claimed in claim 1 comprising step selectors 42, 43 for each coupling table 35, 36, 37, said step selectors 42, 43 adapted to be driven in a forward direction one step for each hour by the closing of a contact means 45 by means of a cam disk 50 arranged on a cam shaft 51.

3. A parking area as claimed in claim 1, wherein a further coupling table 57 is connected to the ticket checking apparatus 19 for varying the rate in correspondence to the length of the parking time, said coupling table 57 having a step selector 58 for the coupling rails 60, 61 of the table and adapted to be advanced in dependence on the number of parking periods.